(12) United States Patent
Reime

(10) Patent No.: US 7,221,271 B2
(45) Date of Patent: May 22, 2007

(54) DEVICE FOR CONTROLLING LIGHTING FOR THE INTERIORS OF AUTOMOTIVE VEHICLES AND METHOD FOR CONTROLLING SAID DEVICE

(76) Inventor: Gerd Reime, Klotzbergstrasse 60i, D-77815 Bühl (DE)

( * ) Notice: Subject to any disclaimer, the term of this patent is extended or adjusted under 35 U.S.C. 154(b) by 202 days.

(21) Appl. No.: 10/533,264

(22) PCT Filed: Oct. 29, 2003

(86) PCT No.: PCT/EP03/11971

§ 371 (c)(1),
(2), (4) Date: Apr. 28, 2005

(87) PCT Pub. No.: WO2004/039631

PCT Pub. Date: May 13, 2004

(65) Prior Publication Data

US 2006/0044800 A1     Mar. 2, 2006

(30) Foreign Application Priority Data

Oct. 31, 2002    (DE) ............... 102 51 133

(51) Int. Cl.
*G08B 13/00* (2006.01)
(52) U.S. Cl. .............. 340/541; 340/540; 340/545.3; 340/815.45; 362/276
(58) Field of Classification Search ............ 340/541, 340/540, 545.3, 815.45, 555, 556, 557, 458; 362/276, 286; 315/307, 224, 225, 77–80
See application file for complete search history.

(56) References Cited

U.S. PATENT DOCUMENTS 5,326,028 A    7/1994    Kano et al.
5,372,545 A    12/1994   Noda et al.
5,491,383 A *  2/1996    Leiber et al. ................ 315/77
5,949,198 A *  9/1999    Nakamura et al. .......... 315/307
6,128,576 A *  10/2000   Nishimoto et al. ......... 701/301
6,137,042 A    10/2000   Kurtzberg et al.
6,914,526 B2 * 7/2005    Wallace et al. ............. 340/541

FOREIGN PATENT DOCUMENTS

| CN | 671 821  | 9/1989 |
| DE | 40 03 581 | 8/1991 |
| DE | 42 32 972 | 4/1994 |

(Continued)

OTHER PUBLICATIONS

International Search Report; PCT/EP03/11971; Feb. 25, 2004.

*Primary Examiner*—Anh V. La
(74) *Attorney, Agent, or Firm*—Cantor Colburn LLP

(57) ABSTRACT

A device for controlling lighting, especially inside the passenger compartments of vehicles, including at least one light source and at least one sensor which influences the light source and which detects at least the movement of a body within the active range of the sensor. A control unit, which is used to control the light source according to a sensor signal provided by a sensor, is associated with the light source. Control unit, which are controlled by the control unit, track the light from the at least one light source according to a sensor signal corresponding to the position of the body. The invention also relates to a method for controlling the device.

27 Claims, 10 Drawing Sheets

FOREIGN PATENT DOCUMENTS

| | | |
|---|---|---|
| DE | 196 53 682 | 6/1998 |
| DE | 197 37 761 | 3/1999 |
| DE | 298 22 554 | 3/1999 |
| DE | 198 12 555 | 9/1999 |
| DE | 199 21 285 | 8/2000 |
| DE | 199 52 795 | 5/2001 |
| DE | 100 22 321 | 11/2001 |
| DE | 101 33 823 | 2/2003 |
| EP | 0 706 648 | 4/1996 |
| EP | 0 722 262 | 7/1996 |
| EP | 1 097 842 | 5/2001 |
| JP | 05 155290 | 6/1993 |
| JP | 08 273838 | 10/1996 |
| JP | 09 048279 | 2/1997 |

\* cited by examiner

DEVICE FOR CONTROLLING LIGHTING FOR THE INTERIORS OF AUTOMOTIVE VEHICLES AND METHOD FOR CONTROLLING SAID DEVICE

REFERENCE TO RELATED APPLICATIONS

The present application claims priority of German Patent Application 102 51 133.0, filed on Oct. 31, 2002, the disclosure of which is hereby expressly also made the object of the present application.

FIELD OF THE INVENTION

The invention relates to a device for controlling lighting, more especially for the interiors of automotive vehicles as well as a method for controlling said device.

As a rule, lamps radiate light when a switch is closed. In this case the lamp shines in a predetermined direction, for example, in the case of table lighting preferably downwards, for wall lighting, for example, at an angle into the room etc. If we wish to alter the lighting where there is a plurality of lamps, normally speaking additional switches have to be closed or respectively opened to switch the lamp on or respectively off.

Such an arrangement is known in the area of lighting for lamps with various preferred directions, for example lighting inside passenger vehicles. At an angle at the front between driver and passenger there is an inside light region with several lighting directions that are often precisely defined one from another. The selection of the "passenger" lighting direction, for example, is meant to prevent the driver being dazzled during the journey. To this end, a lamp is activated, the preferred direction of which points to the passenger, so that he is able, for example, to read a map when traveling at night without disturbing the driver. Often there is an additional type of lighting provided which, with an extended lighting angle, lights up the region between driver and passenger. In addition, as a rule, there is a "driver" lighting direction analogous to the "passenger" lighting direction.

Up to now the activation of these lighting devices is triggered by means of mechanical switches. For ergonomic reasons, the switches are situated in the direct vicinity of the lighting means, that is to say in the passenger vehicle in the so-called "roof area". To switch one on, it is consequently necessary to operate one of the switches referred to above the head. To this end, a good sense of where the button is located is required, in the majority of cases, however, the driver has to look at the lighting device when he is operating the switch. This means that the driver takes his concentration off the road.

An apparatus is known in DE 298 22 554 U1, on which the preamble of the independent claims is based, said apparatus, by means of image acquisition, adapts lighting means to a lighting requirement that has been changed by a movement. For this purpose, a receiving unit that acquires an image is provided in the form of a camera sensor. The images taken are transferred to differential value forming means, which recognize, on account of the difference between consecutive images, whether or not a body has moved and the light tracks the same in a direction-dependent manner. To influence the cone of light of the light source, setting means can also be provided which track the light when the body moves such that the cone of light is expanded in a limited manner. This results in a reduction in the light intensity, but there is no tracking of the amplitude and where applicable of the direction of the light in dependence on a movement pattern of the body recognized by the sensor, as can occur, for example, when the light is dimmed due to the movement of a hand. The use of image-acquiring means with subsequent image processing makes the system additionally very expensive.

DE 196 53 682 makes known a control apparatus, which controls devices for influencing the conditions in a functionally divided room in dependence on the position and dwell time of a tripping means such as a person. Such a device can also be lighting. The preferred area of application, however, for example, is data switching in museums or within the framework of a multimedia show. The word "movement pattern" does appear in column 3, lines 1–5, how however the movement pattern influences which unit remains open on account of the emphasis on the dwell time for controlling the device and also on the functional breakdown of the room.

U.S. Pat. No. 5,326,028 A makes known a means for detecting the position and movement of surfaces or respectively persons situated in a room. Ventilation, but also lighting are adapted to the requirement in the room, changes in the room, such as, for example, also the location of persons being detected by means of a reflection measurement. Certain movements or sequences of movement are not taken into consideration, instead of which the entire room is scanned with spotlights.

DE 197 37 761 A1 makes known a monitoring system, where a first movement indicator detects a movement of an object and, in dependence on the detected movement, a light beam of a second system tracks the moving object. The detection of certain movement patterns is not provided.

In U.S. Pat. No. 6,137,042 a certain acoustic or light event is associated with a certain movement or approaching of a user and this acoustic or light event is played back by means of a computer. Light can certainly also be influenced in terms of amplitude, however no specific sequences are coupled to specific movement patterns.

Patent Application DE 199 52 795 A1 makes known an apparatus where the interior light is only switched on by moving a hand towards the inside lighting of a motor vehicle. This saves the "searching" for the light switch and consequently represents an improvement in driving safety. Another advantage is the omission of mechanical switches and the resultant freedom of design. This arrangement, however, is difficult to operate if more than one lighting direction is selected. In that case, the driver has to turn his gaze to the lighting device again in order to move his hand closer to the correct lamp and consequently obtain the desired light direction. (See DE 42 32 972 C2 for additional in-car lighting.)

For dimming the lighting, contact-free dimmer switches are known, for example, in DE 40 03 581 A1, which, for example, utilize the reflection of an approaching hand. A corresponding solution with a photoelectric barrier is known in DE 198 12 555 A1, where a short interruption in the path of the light rays leads to activation and deactivation and a longer interruption leads to dimming. Intuitive operation is consequently not guaranteed.

Former Patent Application DE 101 33 823.6 makes known a sensor arrangement for determining the position of a body, for example a finger in all three dimensions. Using this type of sensor arrangement, the position of a hand movement to the left or right, or respectively forwards or backwards can be determined. At the same time, this sensor can detect the removal of the hand. When such a sensor arrangement is used, the number of possible lighting directions is obviously freely determinable.

European Patent Application EP 706 648 A1 makes known an optical system for detecting a change in the reflection at an object, where changes in outside light do not exert any influence on the measured value. This system is used substantially as a windscreen wiper sensor for detecting the raindrops falling on a windscreen, but can also be used as a proximity sensor. Two measuring sections are set up there between the transmitting element and the receiving element. Whereas the transmitting element emits the rays, the receiving element determines the reflection reflected at the surfaces or objects. The two measuring sections are operated in time segments via a clock generator. The detection signals detected by the receiving element are analyzed in a synchronous demodulator, which is controlled by the clock generator, back into signals which are can be associated with the individual measuring sections. The useful signal determined by comparing the measuring sections is passed on to an evaluation unit. If a uniform reflection occurs at the two measuring sections, a useful signal of zero is produced. The useful signal is passed to a signal centering level. Depending on whether there is control voltage at its output or not, the volume of radiation radiated into the measuring sections is regulated with this control voltage such that the detection signal is regulated back to zero. Consequently, it is possible to detect changes at the same time as having reliable compensation of outside light.

DISCLOSURE OF THE INVENTION

Proceeding from this state of the art, the object of the present invention is to create a device for controlling lighting with simple, intuitive operation, which where necessary can also be operated blind. In addition, a method to control this device is also to be created.

This object is achieved with a device with the features of claim 1 or with a method with the features of claims 14.

In this case, a sensor detects at least the position of a body in the active region of the sensor—and where applicable also the body moving closer to the sensor—and decides with a control unit not only whether the corresponding light source should be activated or deactivated but, where necessary, also in which direction the light prepared by this light source is to be radiated. As the effective direction is guided in the direction of the body moving away, there is a simple, intuitive controlling means. With several lighting directions, consequently light is tracked in the desired direction. However, it is also possible to track the light in terms of amplitude in dependence on the position or respectively the distance of the body and consequently in terms of intensity, such that contactless dimming is produced.

Further advantages are produced from the subclaims.

BRIEF DESCRIPTION OF THE FIGURES

The invention is described in more detail below by way of the enclosed figures of one exemplified embodiment. In which.

DETAILED DESCRIPTION OF PREFERRED EXEMPLIFIED EMBODIMENTS

Figure 1:
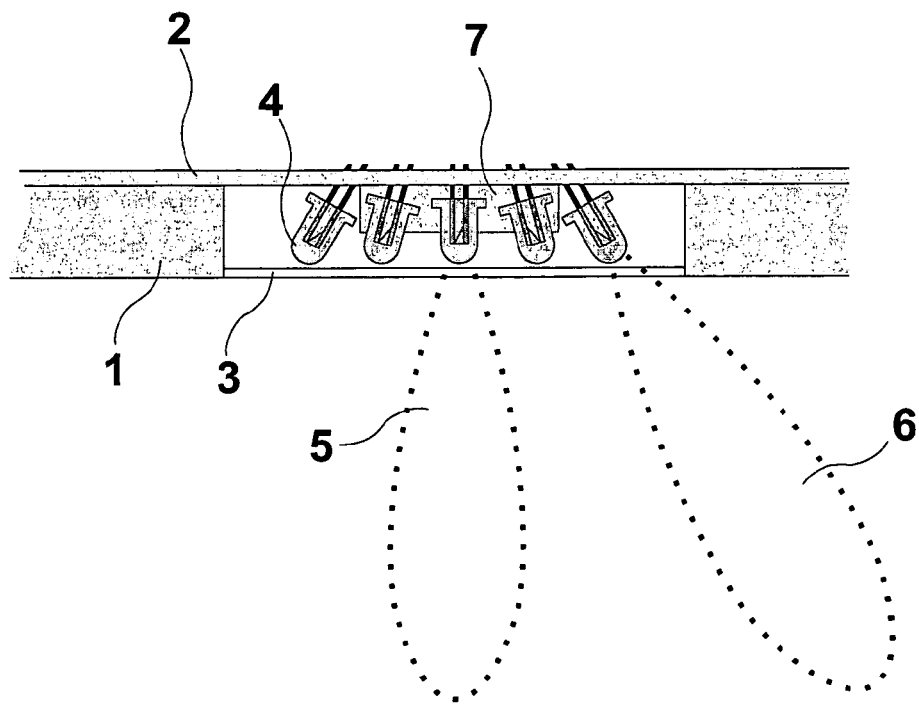
FIG. 1 is a side view of a device according to the invention located in the roof area of a vehicle.

The invention will now be described in more detail by way of example with reference to the enclosed drawings. However, the exemplified embodiments are only examples which are not to restrict the inventive concept to any certain arrangement.

The figures show a device for controlling lighting, more especially for the interiors of automotive vehicles, the exemplified embodiment being explained by way of in-vehicle lighting. The described specific embodiment, however, can easily be transferred to lighting in general, such as, for example, table lamps. In all cases there is a contactless control of a control unit 27 with associated control means 34, which then guarantee the supply with light in the range desired by the user, wherein however there is not only—as in the state of the art—contactless switching, but also a light source is tracked in dependence on a sensor signal, corresponding at least to the position of the body 24, of the movement of the body or of a part of the body 24 such as for example a hand, a leg or a finger, in terms of amplitude and/or in terms of direction. The concept—body—here is a general term including not only parts of the human body but can also include generally arbitrary objects that are to be tracked by a light source.

In general, for this purpose there is provided at least one light source to supply light and at least one, for example, switching sensor 7 influencing the light source, said sensor detecting at least the movement of a body 24 in the active region 18 of the sensor. A control unit 27 is associated with the light source for controlling the light source in dependence on a sensor signal supplied by the sensor. The control means 34, controlled by the control unit 27, then tracks the light of the at least one light source to the movement of the body in terms of amplitude and where applicable dependent on direction. To this end, the sensor 7 has means for recognizing a movement pattern of the body, which means are preferably formed by means of optoelectronic elements for the non-image recognition of the movement pattern in the form of light diodes and photo diodes. However, other suitable recognizing means can also be used. By way of the data regarding the position and where applicable the distance of the body, collected in this way, it is deduced how the user would like to adjust the light. To this end, means are provided for creating a sensor signal in dependence on the movement pattern, such that the control means 34, on account of the sensor signal, track the light of the movement of the body in terms of amplitude and where applicable dependent on direction.

This is now explained using the example of a lighting device, more precisely in-vehicle lighting, as it can be used more especially for the interiors of automotive vehicles, for example, in the roof area of a vehicle, or for the seat lighting in an aeroplane. Nevertheless, this type of intuitively operated device can also be used in other areas, for example in the area of indoor furniture or in workshops.

The lighting device has at least one sensor 7 switching at least one light source 4. Control means 34—identified below as switching and selecting unit 34—are controlled by the control unit and track the light of the at least one light source in dependence on a sensor signal corresponding to the position of the body 24 to the movement of the body dependent on amplitude and/or dependent on direction. The sensor 7 can detect at least the position of the body 24 but preferably also its proximity in a three-dimensional manner. Several and/or separate sensors can be provided for this purpose, however, in principle one single sensor is enough as long as it is capable of supplying the necessary sensor signals regarding proximity/distance and/or position of the body 24.

An intensity control 31 is preferably provided for the brightness, wherein said intensity control responds when the body 24 approaches the active region 18 of the sensor and exceeds a predetermined value 40, and it controls the light at partial output when the predetermined value is exceeded and continues to control it in such a manner that the light becomes brighter up to a maximum output when the body 24 moves away, that is to say the intensity increases, and, where proximity to the sensor 7 increases, the light becomes dimmer until it is finally deactivated, that is to say the intensity is reduced. If therefore the predetermined value is exceeded and the light is activated, the user detects that something "is happening". In a purely intuitive manner, he then moves his hand away and thereby obtains the desired increase in brightness and also alignment towards his hand or respectively the body 24. If the intuitive operation should so require, this principle can be reversed in such a manner that the intensity is reduced when the body moves away from the sensor and the intensity is increased when the body approaches the sensor.

Figure 2:
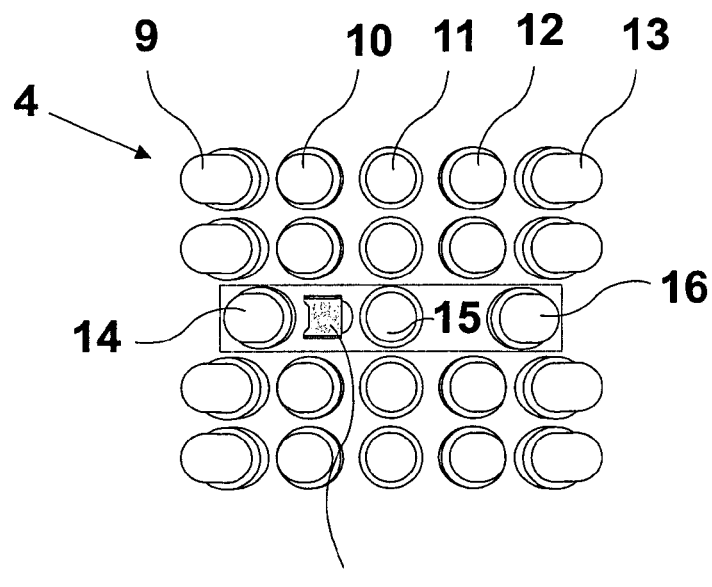
FIG. 2 is a top view of the device in FIG. 1.

In the exemplified embodiment in FIG. 1, the lighting means of the light source are 5 mm white light-emitting diodes 4 with lens. The lens produces a narrow-angled beam 5, 6 of the light. The LEDs are disposed on a bar 2 in a housing 1 for example in the roof area of a motor vehicle in such a manner that they can emit light in five different directions through a translucent window 3. For greater light emission, several light-emitting diodes 9 to 13 per light direction are disposed mechanically in a row (FIG. 2). In the direct vicinity of the lighting arrangement there is a sensor 7 for recognizing a certain movement sequence in its vicinity. This sensor 7 controls the light-emitting diodes according to a recognized movement pattern.

Figure 4:
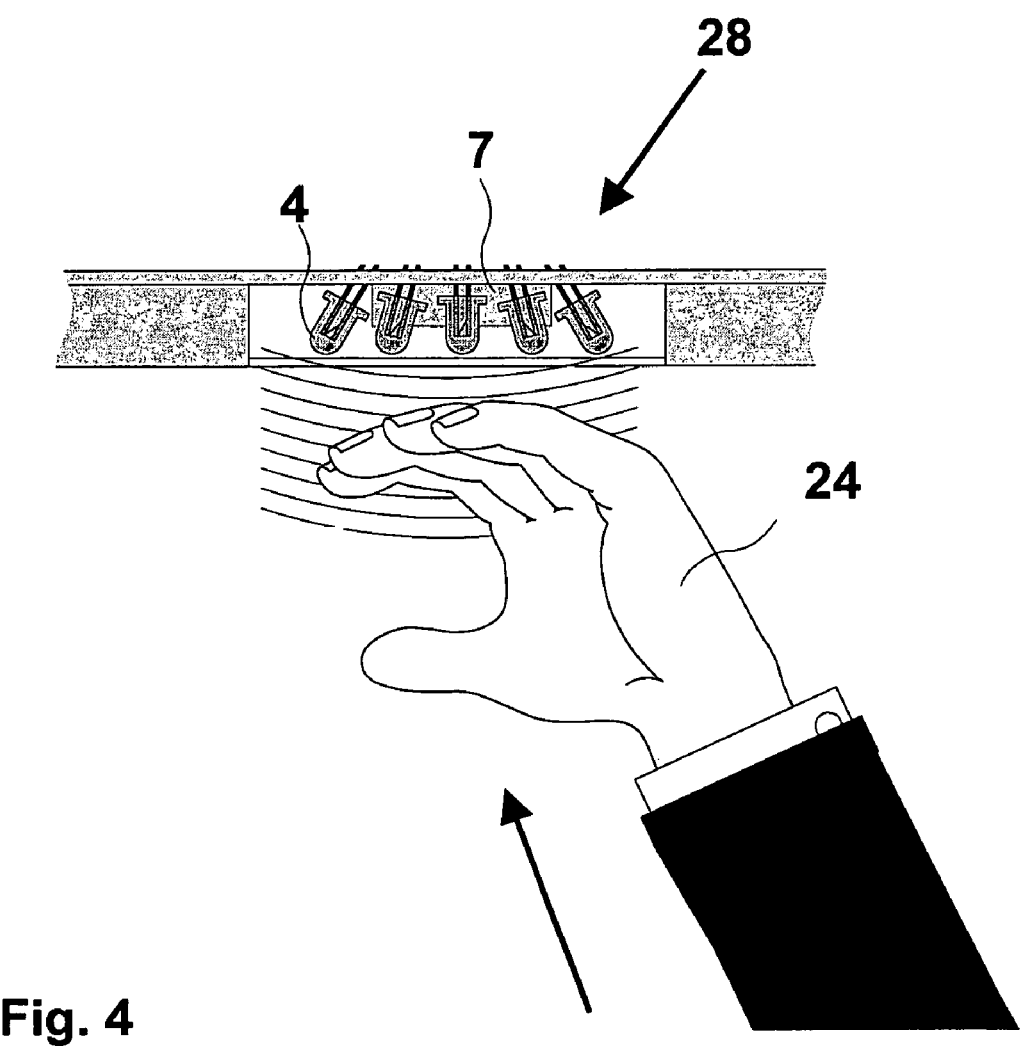
FIG. 4 is a representation of the device with a body moving closer.
Figure 5:
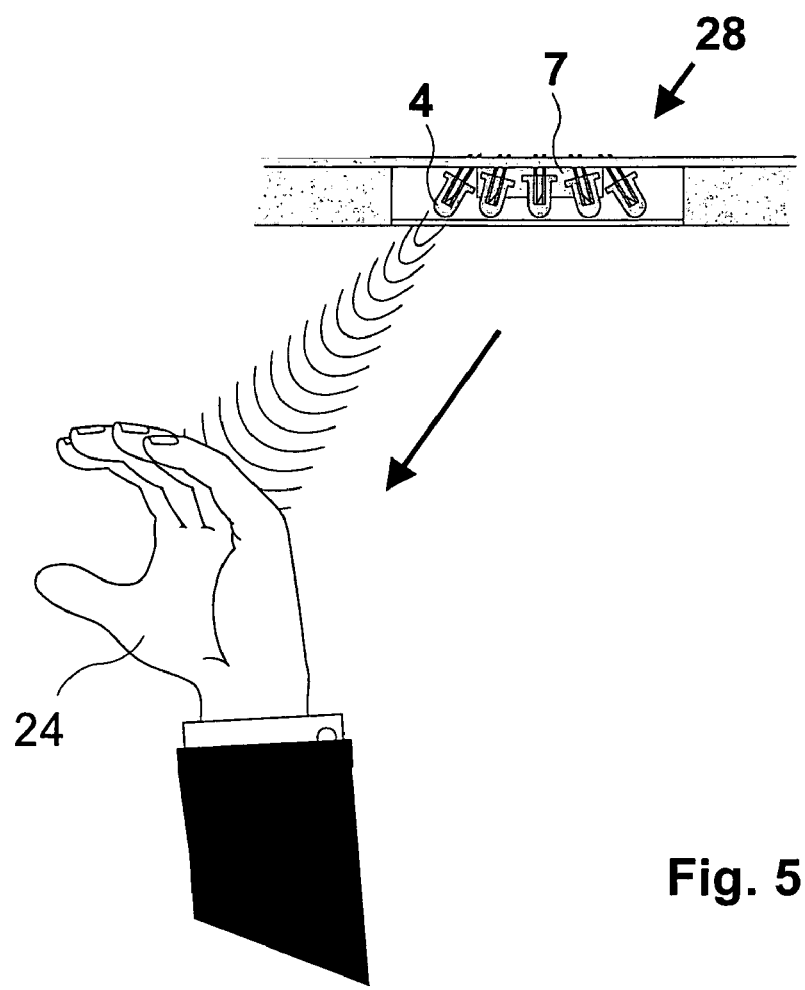
FIG. 5 is a representation of the device according to FIG. 4 with a body moving away in a certain direction.
Figure 6:
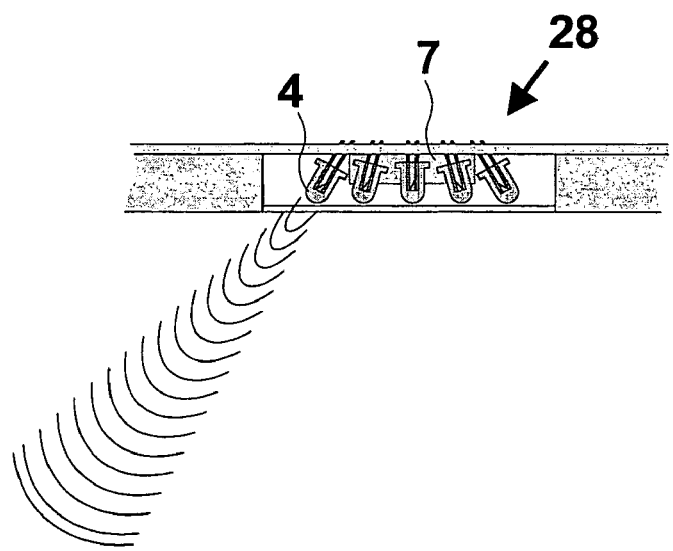
FIG. 6 is the device orientated as in FIG. 4.

Taking the example of in-car lighting, a hand 24, as the body to be recognized, is moved towards the lamp in FIG. 4 to activate and control the light. In the vicinity of the lighting device, for example 15 cm away from it, the lighting is activated (FIG. 4). In order not to dazzle the driver, activation is effected preferably at partial output or respectively intensity, for example at only 50% of the maximum output. As long as the user moves his hand at a constant distance from the sensor, the light intensity remains unchanged. The user then pulls his hand in the direction in which he would like to have the light, in the exemplified embodiment in FIG. 5 to the left. The sensor 7 detecting the movement detects the direction of movement of the hand 24 away from the lighting device and selects one of, for example, five directions. The row of LEDs disposed in this direction of movement is then activated at 100% output, whilst the remaining LEDs are deactivated. If the user wishes to direct the light at any particular time, he has only to move his hand 24 keeping a constant distance between his hand and the sensor 7, the light following the movement at constant brightness. In order to give the user the impression of one single light, with respect to the angle of radiation the light sources or LEDs radiating in the different directions do not have to be disposed in rows but can be mixed up together or respectively can be nested.

Consequently, with a simple, intuitive hand movement the light can be activated and directed into the desired direction.

The user moves his hand 24 back in the direction of the lighting device to deactivate it. In the vicinity of the lighting device, for example at a distance of less than 15 cm, the brightness regulating means 31 regulates the light strength to lower values analogous to the proximity. This also gives the user the feeling that something "is happening". As the body moves closer, when the lighting has been regulated down, for example to 10%, the light is deactivated. The light is deactivated consequently in just as simple a manner as it is activated.

The regulating down of the light when the body gets closer is based on the following: If the active region of the sensor 7 is brushed over by mistake by a random movement, it does not result in the lighting being deactivated in a manner which is perhaps surprising to the user. Rathermore, the regulating down of the lighting indicates to the user that he is in the active region of the sensor. He can then move away from there without deactivating the light—or he can deactive the light on purpose by moving closer.

Figure 3:
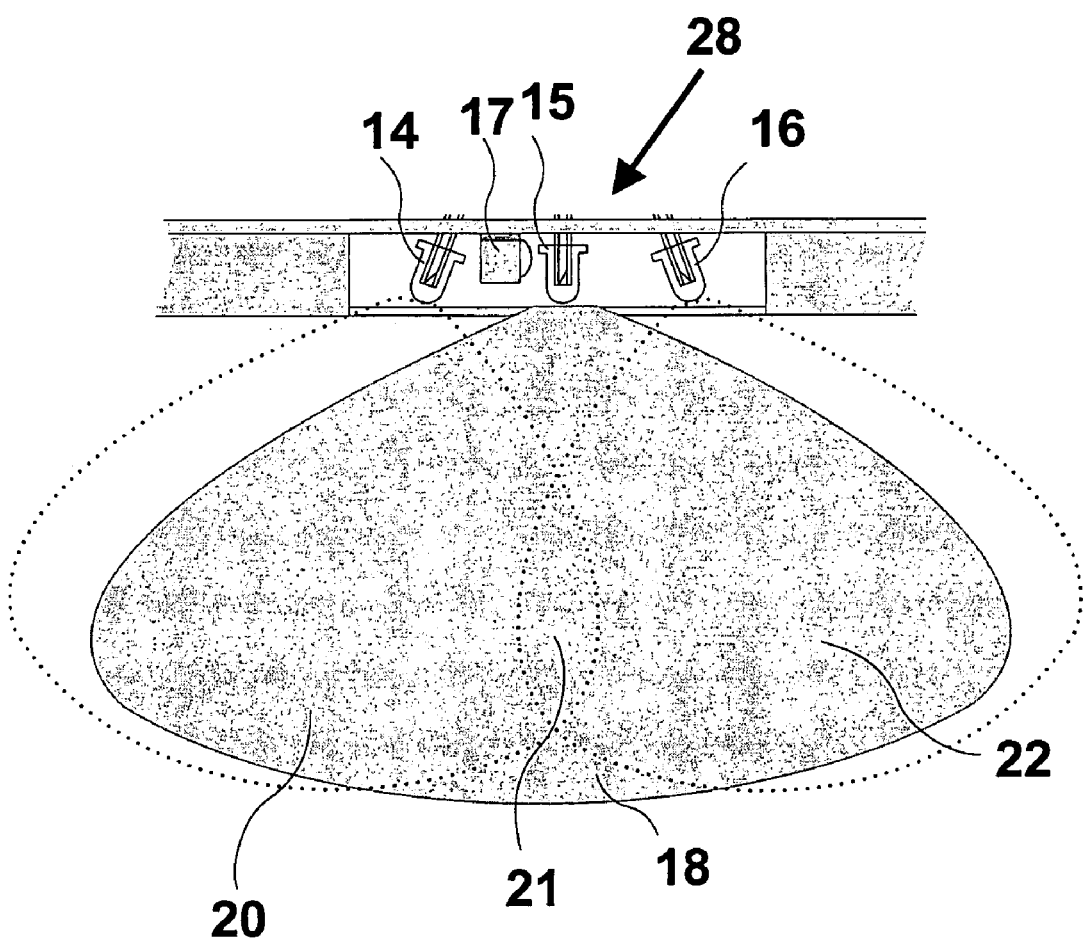
FIG. 3 is a side view of the sensor in FIG. 2 to illustrate the direction detection regions.

The proximity of the hand 24 must be recognized initially before the movement pattern can be recognized. At the same time, the position should be recognized with reference to the central axis or respectively centre of the direction detection region 21 in FIG. 3. The sensor unit, for this purpose, for example, has two light-emitting diodes 14, 16, in the effective region of which direction detection is possible in the direction detection regions 20, 22. The direction detection regions together define the active region 18 of the sensor. To this end, in a known manner, light that is alternately clocked and radiated by the light-emitting diodes 14, 16, can be reflected, for example, on a body, like the hand 24 and can be received by a receiving means like the photo diode 15. The recognizing of the position of the body with reference to the direction detection region occurs in FIG. 7 in the circuit arrangement of sensor unit 28, proximity detecting means 29 and threshold detection means 30. The circuit arrangement 28/29 supplies a signal for the proximity and the circuit arrangement 28/33 supplies a direction signal.

The signals for the first recognition of the hand 24 in FIG. 4 at, for example, a distance of 15 cm and for a second recognition of the hand in the direct vicinity of the sensor unit, for example at 3 cm, are associated with the proximity signal in the threshold value detecting means 30. The brightness regulating means 31 converts the distance data into brightness data for the LEDs 9–13. The logic unit 32 links the data coming from the threshold detecting means 30 and the brightness regulating means 31 to a brightness and switching function for the switching and selecting unit 34.

This occurs in the exemplified embodiment from an idle state in the following manner: If a hand 24 is moved towards the sensor unit 28, this latter outputs a signal 28a for proximity and position to the proximity detecting means 29. This latter reacts only to signals which correspond to the hand moving closer, and passes them on to the threshold detecting means 30 and the brightness regulating means 31. At a predetermined proximity, for example, 10 cm, the threshold detecting means 30 outputs a first output signal 30a to the logic unit 32. This latter then outputs a control signal 32a to the selecting unit 34, as a result of which the switching and selecting unit illuminates all LEDs 9–13 at, for example, 50% brightness.

Figure 7:
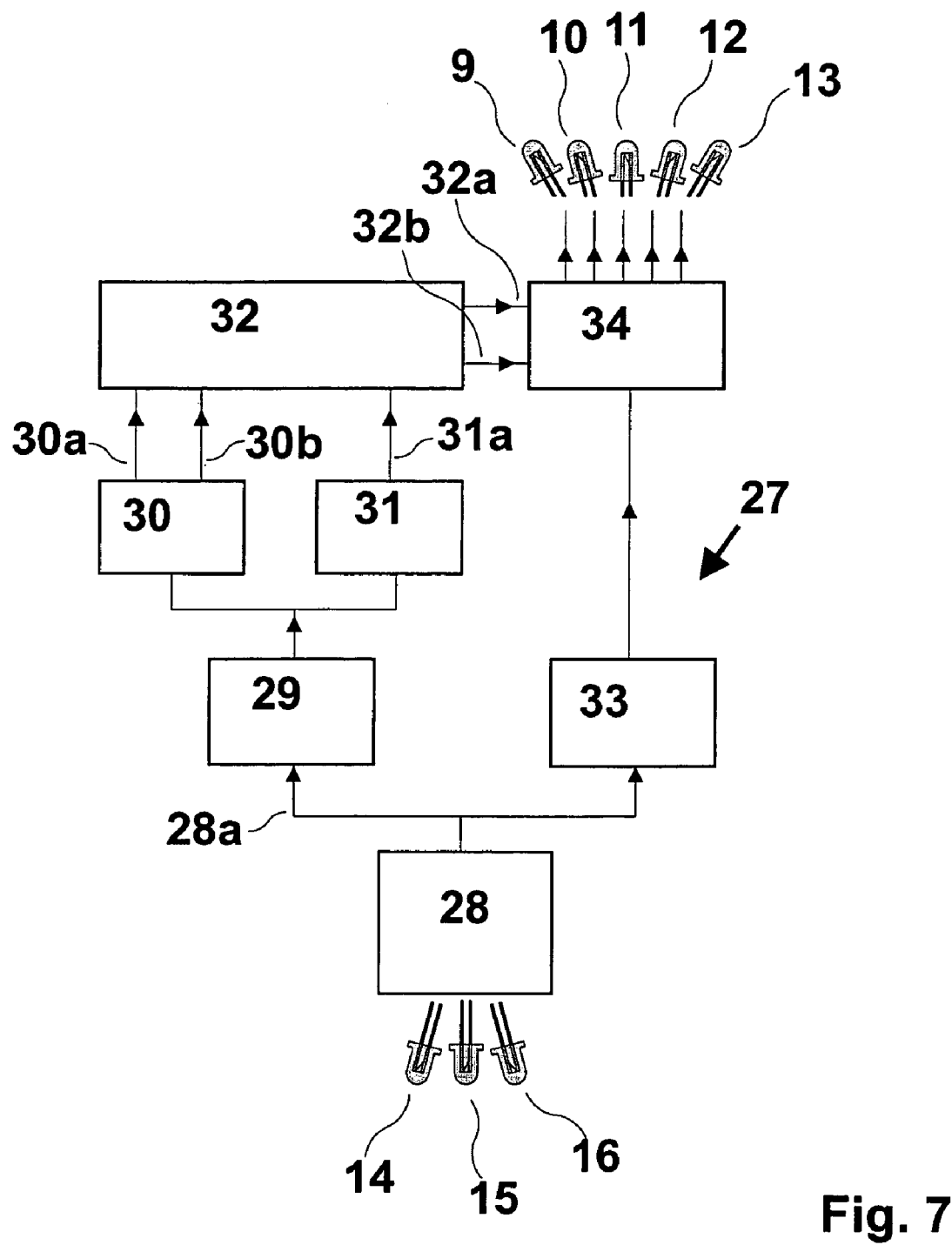
FIG. 7 is a block diagram of the control unit.

If the hand 24 is moved away again, the logic unit 32 recognizes this by the switching back of the threshold signal 30a and then evaluates the brightness data 31a determined from the distance of the hand in such a manner that the brightness increases as the distance increases. At the same time the selecting unit 34 is activated via a control signal 32b. This selecting unit evaluates the data coming from the direction and position detecting means 33 in order to make a direction-dependent selection of the light-emitting diodes 9–13. This means that a harmonization of the light position and the hand position is guaranteed by selection of the LEDs pointing approximately in the direction of the hand 24 that is moving back. For reasons of simplicity, only the first of, for example, each of four LEDs is represented in FIG. 7 which all point in the same direction.

When a certain distance between the hand 24 and the sensor is exceeded, for example 30 cm, the threshold detecting means 30 detects this and outputs a second output signal 30b to the logic unit 32. This logic unit locks the selecting unit 34 with a control signal 32b and maintains the current position of the light emission.

Consequently, with the hand moving closer to the lighting unit, the light is activated at half intensity. When the hand moves away in the desired direction, the light is regulated brighter and is directed to the position of the hand. As it moves further away, the light remains in the desired position.

To deactivate the lighting, the hand is put up towards the lighting device once again. From a certain vicinity, for example 15 cm, the threshold detecting means 30 outputs a control signal to the logic unit 32. This latter links the data of the brightness regulating means 31 to the switching and selecting unit in such a manner that if the hand continues to approach the sensor the strength of the lighting is decreased. Where a certain distance is fallen below, for example, 3 cm, the threshold detecting means 30 outputs a second signal to the logic unit 32, which as a result deactivates the light via the switching and selecting unit 34. To activate the lighting again, the hand has first to be moved away from the lighting device by a minimum amount, for example 15 cm. As a result, the lighting device reverts to the idle state.

Up to now, the exemplified embodiment has been explained using as the light source a number of lighting means, which are disposed in such a manner that they can each shine in different directions. Alternatively, one or a plurality of lighting means can be driven via a motor, preferably a setting motor, in such a manner that direction-dependent illumination is also possible by tracking of the lighting means.

The sensor can be shaped in an arbitrary manner. For example, ultrasound sensors, capacitive sensors and also optical sensors can be used to detect the distance and the position.

It is also conceivable to operate without the distance detecting means, if it is possible for the sensor to react in not such a user-friendly manner. In this case, only the data of the position detecting means 33 in FIG. 7 is evaluated. It is assumed here that, as a rule, whilst a hand is approaching the sensor, the position changes relative to the central axis of the direction detection region 21 in FIG. 3. This change, as it were a "wobble", is perceived all the stronger the nearer the hand comes to the sensor unit. If this change exceeds a predetermined value, the lighting device is activated. After determining the position of the hand, the LED row pointing in the corresponding direction is activated as the sole one. If no changes in the positional values are made then for a predetermined period of time, it can be assumed that the hand has moved away. The position detecting means 33 is monitored again for deactivation. If the change exceeds a predetermined value, by the hand moving closer, the lighting is deactivated.

Figure 8:
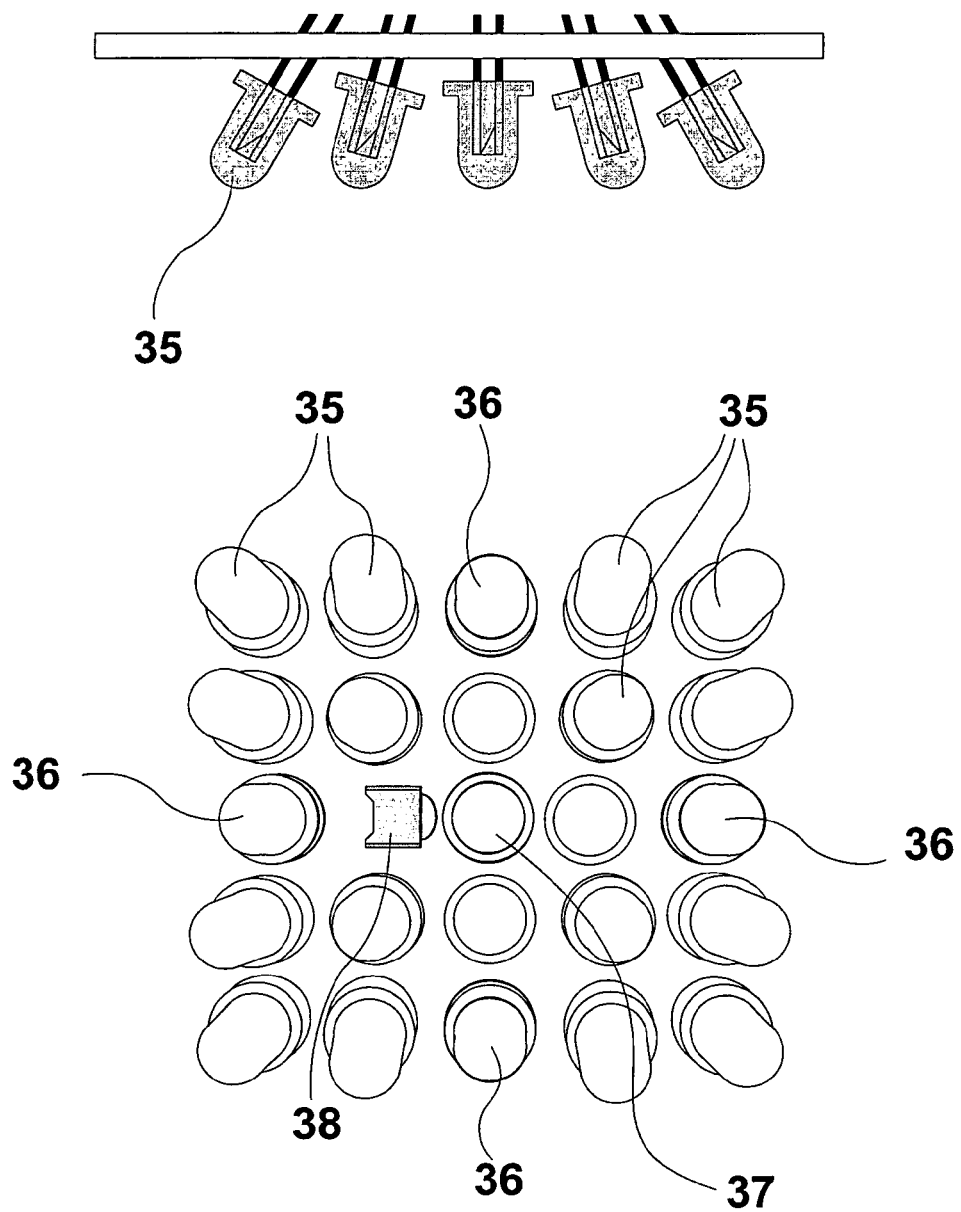
FIG. 8 is a top view of a device in a second exemplified embodiment.

Obviously, the direction of the lighting does not have to be restricted to one plane, or respectively to only five positions. Former Patent Application DE 101 33 823.6 makes known a sensor arrangement for determining the position of a body, for example a finger in all three spatial dimensions. Using this type of sensor arrangement, the position of the hand movement can be determined to the left or to the right, or respectively forwards or backwards. At the same time, this sensor can determine the removal of the hand 24. When using this type of sensor arrangement, the number of possible lighting devices is obviously freely determinable. To obtain intermediate values, every other adjacent lighting angle can be activated at the same time, for example at half intensity in order to obtain the same brightness when the angle of the lighting is altered. Such an arrangement is shown in the exemplified embodiment in FIG. 8. The photo diode 37 is in the centre of the arrangement and the LEDs 36 necessary for position determining are grouped in the form of a cross around the photo diode. The laterally radiating LED 38 compensates for outside light, as is made known in EP 706 648 A1. All other LEDs 35 shine in different directions. Obviously, the sensor arrangement can also be mounted outside the lighting device, an arrangement inside the lighting means simply offers the advantage of intuitive operability.

Figure 9A:
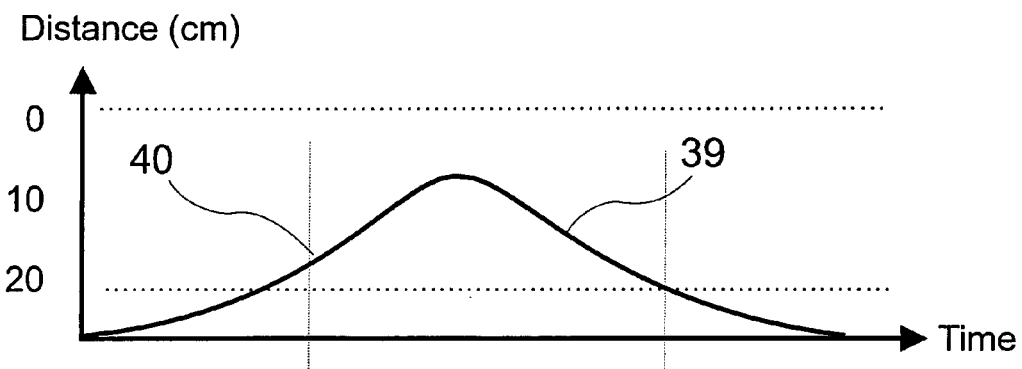
FIGS. 9a–9c are diagrams of the distance, the light intensity and the signal for activating the direction detection means over the time when activating and orientating the device.
Figure 9B:
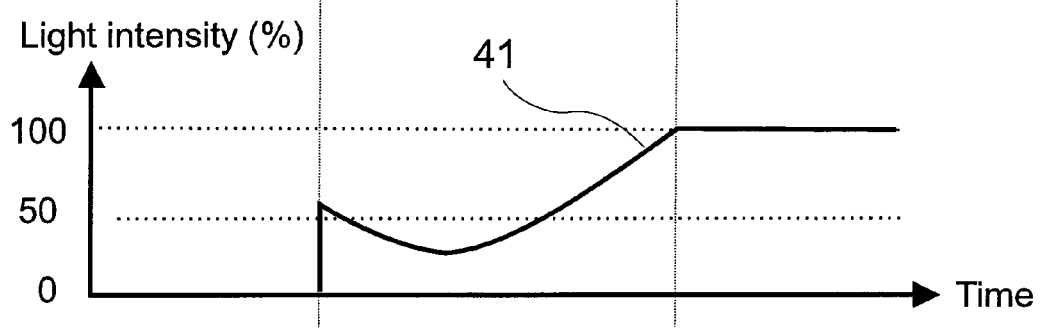
Figure 9C:
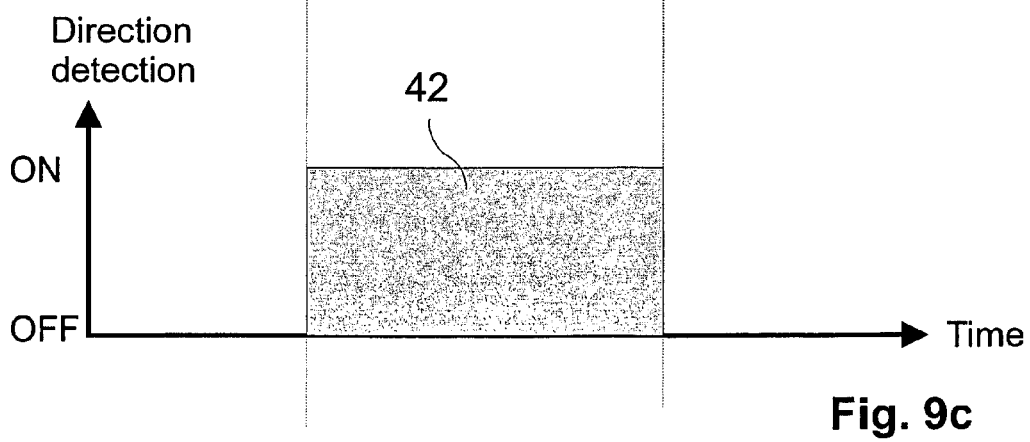

FIGS. 9a to 9c show the correlation between the distance of a reflecting object, in the exemplified embodiment a hand, and the switching and regulating operation of the lighting. The curve 39 in FIG. 9a corresponds to the hand moving closer to the sensor apparatus. From a proximity of ca. 15 cm, corresponding to position or threshold value 40, the lighting is activated in accordance with the curve 41 of the light intensity in FIG. 9b at approximately half light output. Going even closer leads to a decrease in intensity of the lighting and moving away leads to regulation to full light output. At the same time, the direction detecting means is activated during a period of time 42 in FIG. 9c, in this case the light "follows" the moving hand. The direction detection means can be deactivated, for example when full light output of the lighting is reached, that is if the hand has been moved away in the desired direction of the light. Consequently, this guarantees that if the hand is inadvertently moved closer to the lighting unit, the direction does not suddenly veer round and possibly dazzle the driver.

Figure 10A:
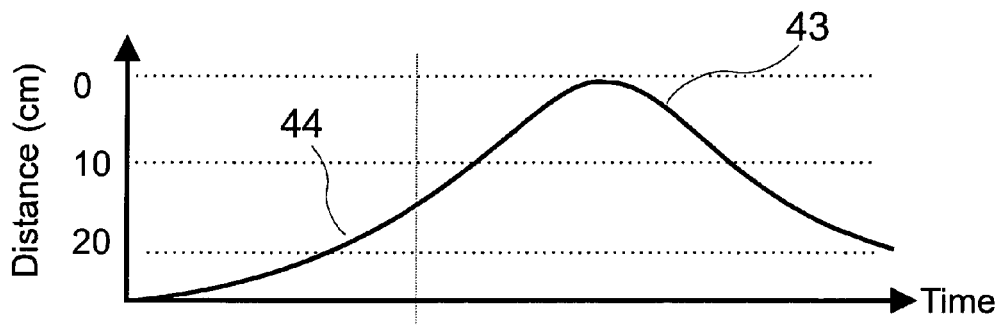
FIGS. 10a, 10b are diagrams of the distance and the light intensity over the time for the deactivation of the device.
Figure 10B:
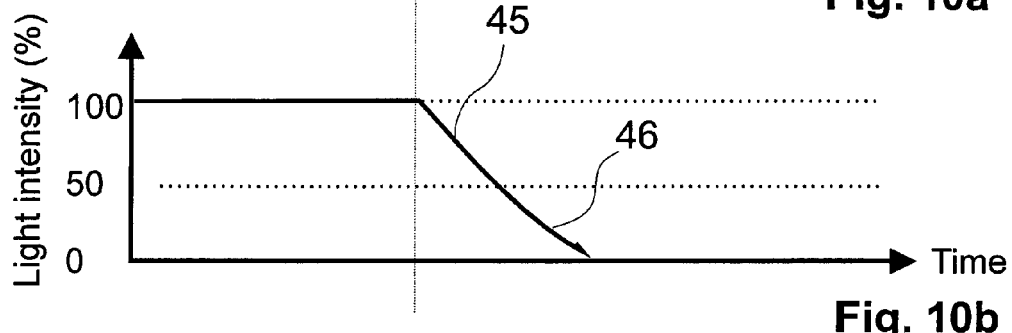

Deactivation is effected in a similar manner to activation. FIG. 10a shows a movement sequence 43, where the hand has initially moved as close to the lighting unit as possible until the brightness regulating means 31 responds at a distance corresponding to the threshold 44. This shows the user that he is in the active region of the sensor. Moving even closer initially results in FIG. 10b in a further decrease 45 of the lighting down to zero. Lighting of, for example, less than 10% can transfer directly to deactivation at the point in time

46. Alternatively, it can also be provided that the light is reduced to 10% the first time the hand moves closer and is fixed at this light output and that deactivation only occurs the second time the hand is moved closer in order, for example, to avoid inadvertent wrong operation.

Figure 11A:
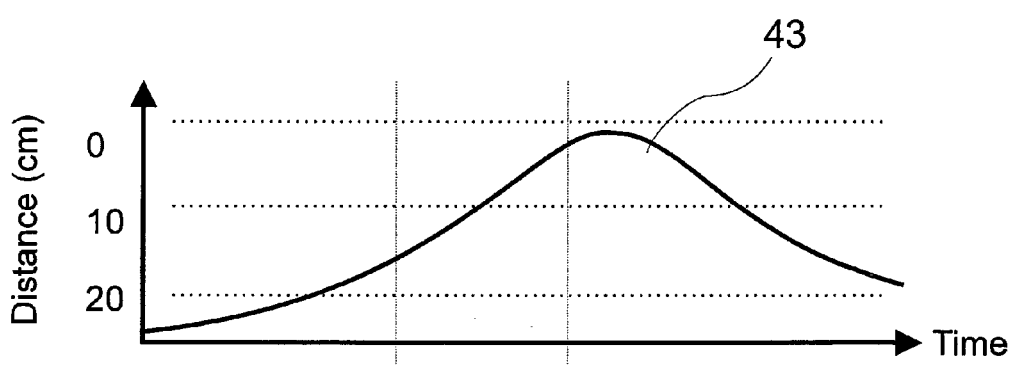
FIGS. 11a, 11b are diagrams of the distance and the light intensity over the time in the event of an unintentional activation and subsequent deactivation of the device.
Figure 11B:
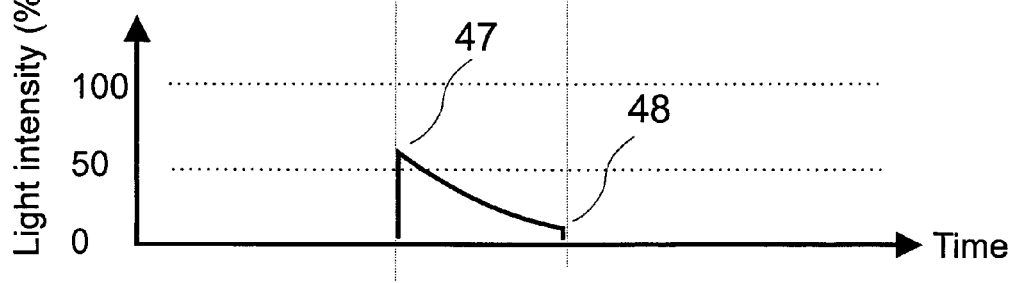

If one were to approach a deactivated lighting unit inadvertently, such that the lighting was activated unintentionally, a curve 47 according to FIG. 11*a* would be produced. Going even closer until in the direct vicinity of the lighting device, the light can immediately be regulated down and deactivated at the time 48.

Consequently, an intuitive and extremely simple operation of a sensor-controlled lighting device is provided.

As a rule, it is preferable for the sensor arrangement to be operated with a nonvisible wavelength, for example infrared, whilst the lighting unit will operate naturally in the visible wavelength range. However, with the electronics designed in a corresponding manner, the lighting device itself can also be incorporated into the sensor function. In this case one or several lighting LEDs, pointing in the corresponding direction, are operated in the short term as sensor transmitting elements. If this occurs, for example 50× a second for, for example, 0.2 ms, this corresponds to a "light output" for the eye of a hundredth of the possible overall light strength. This then in practice is perhaps just visible as a weak glimmer. Depending on the switching state, in the measuring intervals the lighting device is then either activated or deactivated, or respectively in the regulated state.

Figure 12:
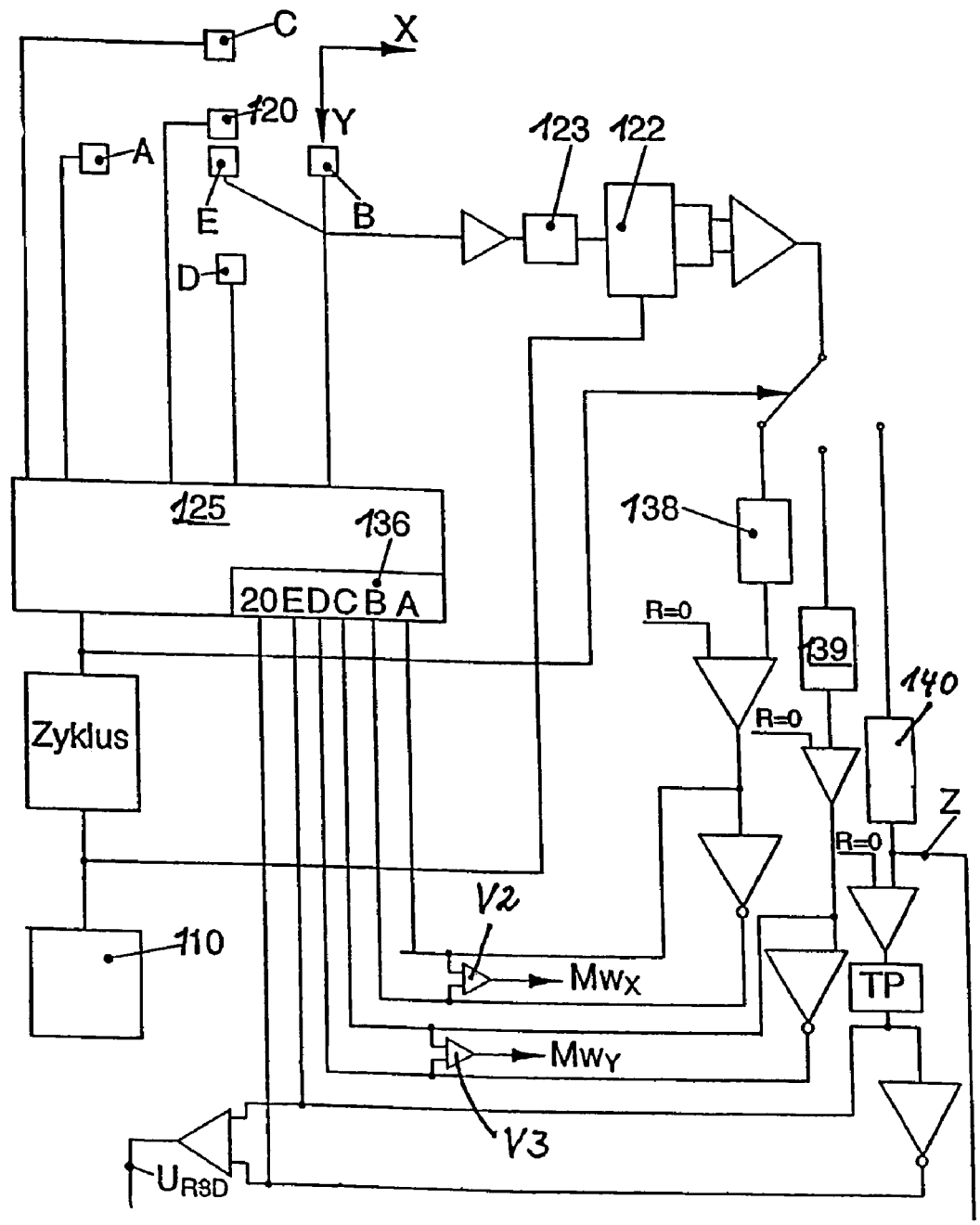
FIG. 12 is a circuit for three-dimensional positional detection.

FIG. 12 shows a possible design for a sensor circuit according to former German Patent Application 101 33 823.6. If something is not explained below, reference is made to the disclosure content of this Patent Application, the content of which is hereby expressly made the object of the present Application. The figure shows an opto-electronic apparatus for detecting the position and/or movement of a body, said apparatus including several transmitters A, B, C, D for emitting luminous radiation.

At least one receiver E, for receiving the rays emitted by the transmitters A–D and reflected by the body, is associated with the transmitters. Between the transmitters, the body and the receivers, depending on the circuitry, several radiation sections are formed which differ from each other, in the case of light these are light sections, in which at least one part of the transmitters A–D and the receivers E participate. The transmitters are controlled by a clock generator 110.

The signals detected by the receivers are passed on to an evaluation device, which converts the signals received by the receivers E from the different light sections initially into two-dimensional values x, y for detecting the position and/or the movement, for example of a hand in or along a surface. To detect the position and/or movement of the body in a three-dimensional manner, the clock circuit in FIG. 12 then activates the transmitters A–D and/or the receivers E in an additional clock pulse in such a manner that the space, in which the transmitters A–D are beaming, is illuminated as far as possible uniformly at the same clock operation. The evaluation device can then, on account of the radiation reflected by the body during this additional clocking, determine a value for determining the distance of the body from the surface.

Figure 13:
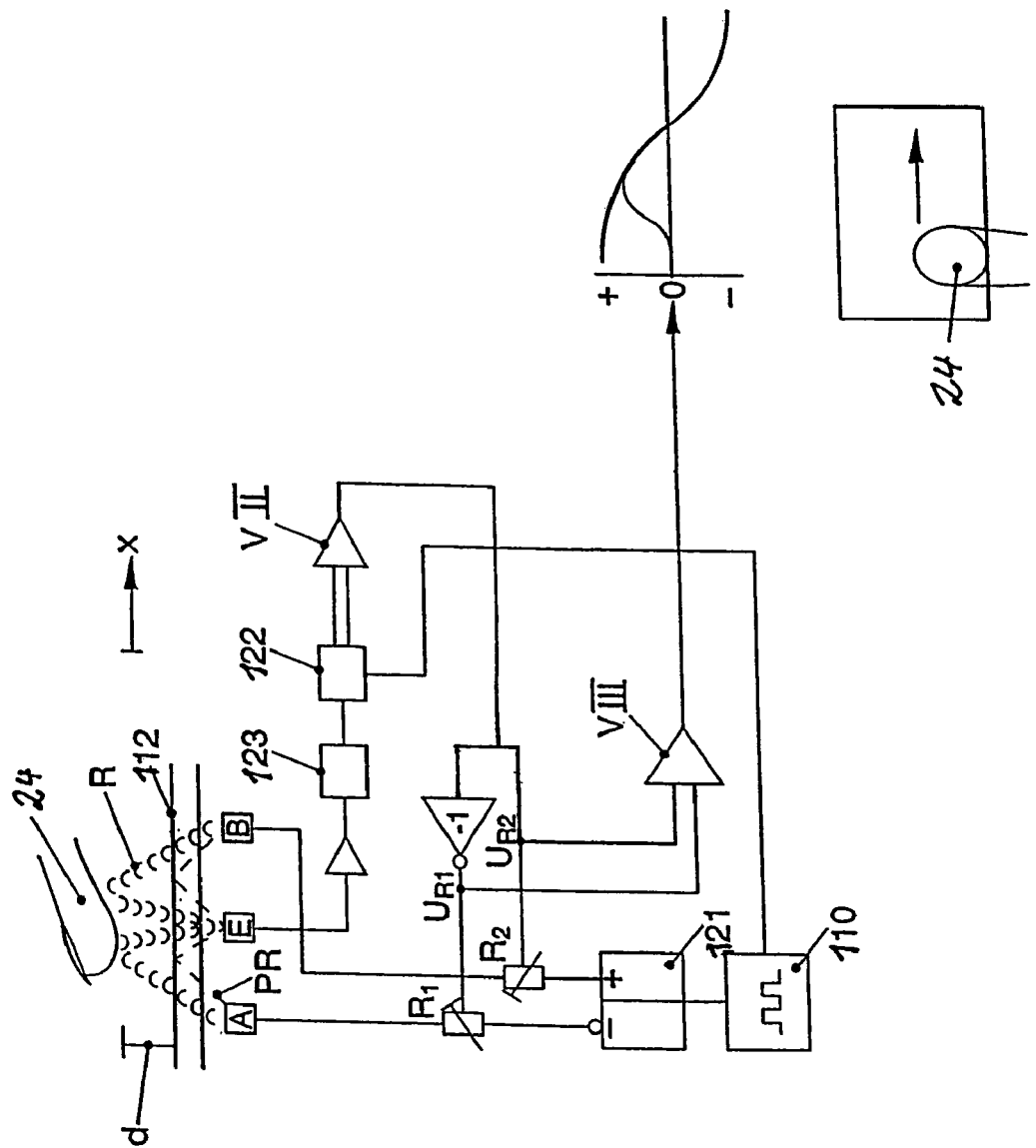
FIG. 13 is a circuit for a one-dimensional positional detection.

The position, for example of the hand above a given surface can be determined in the simplest manner by two separate sensor elements, which, for example as shown in FIG. 12, are disposed in the shape of a cross. One sensor element with the transmitters A, B determines the horizontal position and the other element with the transmitters C, D determines the vertical position. The measured values determined from the reflected light each produce the horizontal or vertical position of the body outside the operator interface. FIG. 13 explains the principle for detecting the position in a one-dimensional manner. The transmitters A, B are, for example LEDs, the receiver E is, for example a photodiode or a light diode correspondingly wired as a receiver. The transmitters A, B are controlled in an inverted manner by means of the inverter. In this case, their output is regulated by the regulating resistors R1, R2 in such a manner that there is a constant light portion with no clock-synchronous alternating portion at the receiver E. Contrary to EP 706 648 A1, however, the efficiency ratio of the transmitting elements is not adjusted consciously in a time-delayed manner but as quickly as possible. This means that there is an immediate reaction correcting the control voltage for the transmission of the transmitting elements in the event of the body 24 changing its position.

The static value of the control voltage is required for determining the position. In order to obtain this value where possible independently of thermal influences or ageing influences, the control voltage $U_{R,1}$, $U_{R,2}$ supplied to the individual regulating resistors R1, R2 is tapped to adjust the output power and is compared with the comparator V III. The value determined via the comparator VIII represents the electrical value of the mechanical position, for example of a hand in the x direction. The signal determined by the receiver E is supplied to a high pass 123 and a synchronous demodulator 122 and is compared in a clock pulse manner by means of subsequent comparison in the comparator VII. Where a body 24 is present, there is consequently a value for the control voltage that is supplied in a reverse manner to the regulating resistors R1, R2.

Without the presence of the body, parasitic reflection, with the corresponding design, scatters approximately the same portions of transmitting power from A and B reciprocally to the receiver E. In this case the control voltage remains almost uninfluenced, that is at zero. When a body moves in a non-symmetrical manner closer to the centre, the control loop attempts to adjust the light output in such a manner that there is once again a constant light signal with no alternating light portions at the receiver E. This results in a displacement of the control voltage symmetry at the regulating resistors R1, R2 and consequently also in an output signal at the comparator V III depending on the positioning of the hand 24 to the right or left of the central point of the mechanical arrangement. The output signal assumes more or less positive or respectively negative values, as can be seen at the bottom on the right in FIG. 1 when a hand is moved.

The measuring section represented can obviously only fulfill a one-dimensional function. Two separate measuring sections, offset from each other where possible by 90°, are required to detect the position in a two-dimensional manner. The receiver E can be used in common for the two measuring sections, that is A, B and C, D. In this case, the light section in the x direction and the light section in the y direction are clocked in a two-way alternate manner. This can be effected by changing over in each case after several clock periods, for example 30×A/B and then 30×C/D or by changing over after each clock cycle. The only important point is that the measured value output is correspondingly associated with the respective clock cycles.

To detect the third dimension, where the surface 112 is flat, the position of the body in relation to the surface 112 has to be determined. If we assume an almost flat arrangement of the optical elements, that is to say if we assume that no transmitters or receiver protrude upwards out of the surface 112, the position of the body can be determined substantially through just reflection R. To detect the position in the third dimension, in accordance with FIG. 12, at least one additional clock cycle is added to the two clock cycles for determining the x value and the y value of the position of the actuating element on the surface 112. In this additional clock cycle the transmitters A–D are controlled in such a manner that they all or at least a part thereof obtain the same clock signal, that is to say they all illuminate at the same time. In this case it is not necessary for them to be individually regulated, as is necessary for determining the position in the x and y direction. In addition, at least one additional light source 120 is disposed as compensation means in the vicinity of the receiver or receivers E in such a manner that the light radiated from this additional light source beams almost exclusively into the receivers. If ambient light is not an issue, there is no need for these compensation means.

If the body approaches the surface 112, this is recognized by means of recognizing means 114 and can, for example, activate the determining of the position in the x and y directions. Each movement away from the surface 112 leads to a change in the control voltage $U_{R3D}$, which is proportional to the distance between the body and the surface 112. The clock circuit has a clock distributor 125, which not only controls the respective transmitters and receivers, but at the same time also controls the output controlling means 136 in a corresponding manner such that the corresponding measured values $Mw_x$ and $Mw_y$ can be detected by the comparators V2 and V3.

The sensor 7, which is used, for example, in a table lamp analogous to FIG. 4, recognizes the body 24 is approaching for deactivating the device. Where a predetermined distance, which corresponds to a maximum of the outside boundary of the active region 18 of the sensor, between body and sensor is fallen below, the control means 34, if the body continues to move closer to the sensor, gradually switch, regulate or dim the light source down until the light source is extinguished.

When the body 24 makes a movement in the active region 18 of the sensor at a constant distance from the sensor, that is, for example, on a curved path, the light is tracked at constant intensity in a direction-dependent manner. Consequently, particularly when used in the vehicle, this guarantees that no unintentional abrupt dazzling of the light is possible. If the amplitude is influenced, the device can also be used, for example, on a table lamp in order to influence the intensity of the light in a contactless manner just by means of movement, that is, for example, for step by step switching or continuous regulating or respectively dimming.

For the gradual tracking of the light intensity, that is to say for dimming the light, the control means 34, proceeding from a state with predetermined light intensity at a predetermined position of the body 24, alter either the intensity in the one direction when the body 24 continues to come closer, or in the other direction when the body 24 moves away again. Consequently, for example, light can be dimmed or respectively regulated up to a certain point. If there is a movement opposing the respective direction, however, the intensity obtained remains the same until another movement is made past the obtained intensity. In addition, below a predetermined intensity, the light can only be reduced down to deactivation.

For operation, the user moves his hand 24 towards the lamp as the light source. From a certain point the sensor recognizes that a predetermined value has been exceeded and activates the light preferably at half intensity, but where applicable also at full intensity. Depending on the direction of movement of the body towards the sensor or away from the sensor, the intensity or brightness of the light is altered. Where the intensity is reduced, the control means can evaluate the control signal, for example in such a manner that there is only a change in the brightness when the body approaches the sensor and not when it moves away (or vice versa). This can be effected, for example, via a counter, which only counts in one direction. Or where the intensity is increased, proceeding from its activation state or from the last adjusted output state, the sensor detects the body moving away and tracks the brightness up to maximum intensity, the body moving closer subsequently resulting in the desired brightness being set (or vice versa). However, the control means can only allow an increase to maximum output or respectively a reduction to minimum output.

In addition, more especially when the device is to be operated blind or without being looked at, an indicating device can be provided for acoustic acknowledgement with at least one sound or acoustic pattern. In dependence on the movement detected by the sensor, this indicating device generates at least one sound or one acoustic pattern, different acoustic patterns being generated preferably for deactivation or activation of the light source or for tracking, dimming or regulating.

The exemplified embodiment related expressly to the control of light. In order to illustrate the transferability of the principle to other areas, all that is necessary is to replace light with air and to replace the lighting device by a ventilating device in the exemplified embodiment. There is then a substantially analogous design, which, for example, can be used for controlling a ventilating means. Devices for controlling lighting, ventilation or so on are basically known in the form of, for example, alarm systems or also means for controlling ventilation systems, means to control the temperature of heating plates or even of water outlets. In all cases there is contactless control of a control unit with associated controlling means, which then guarantee the supply of the respective medium (in the examples referred to light, air, heat and water) to the extent required by the user.

Points of the invention, which can also be used on their own, are consequently:
- The use of a sensor, which carries out a determination of the position of the body without image acquisition and image analysis.
- The use of light-emitting diodes and photodiodes or even just light-emitting diodes as opto-electronic elements for recognizing movement patterns.
- The recognition of intuitive movement patterns for activation and deactivation and more especially for dimming a light source.
- The use of the principle also for controlling devices for preparing other media.

It is obvious that this description can be subject to the most varied of modifications, changes and adaptations, which are to be found in the region of equivalents to the attached claims.

The invention claimed is:

1. Device for controlling lighting, for the interiors of automotive vehicles, the device comprising:
   at least one light source;
   at least one sensor which influences the light source and detects at least the movement of a body or of a part of the body within an active region of the sensor; and
   a control unit associated with the light source for controlling the light source in dependence on a sensor signal supplied by the sensor by means of control means, which tracks the light of the light source in dependence on the sensor signal, the sensor signal corresponding at least to a position of the body, indicating movement of the body;

wherein the sensor includes means for recognizing a movement pattern of the body;

wherein means are provided for generating a sensor signal in dependence on the movement pattern;

wherein, on account of the sensor signal, the control means tracks the light to the movement of the body in terms of amplitude and, where applicable dependent on direction.

2. Device according to claim 1, wherein the sensor includes optoelectronic elements for non-image recognition of the movement pattern.

3. Device according to claim 2, wherein the sensor is an optical sensor, the optical sensor disposed inside the controlling device.

4. Device according to claim 1, wherein the light source is formed by an LED or by a plurality of LEDs disposed in rows.

5. Device according to claim 1, wherein the light source is formed by at least one LED, which is at least partially a part of an optical sensor unit adapted to be the sensor.

6. Device according to claim 1, wherein there are several light sources provided which are nested together with respect to their direction of radiation.

7. Device according to claim 1, wherein the sensor detects the position and/or proximity of the body in a three-dimensional manner.

8. Device according to claim 1, wherein the light source includes lighting means, which work in various directions, and wherein the control means partially activate the lighting means for tracking in a direction of the detected body.

9. Device according to claim 1, wherein a motor is associated with the light source, the control means controlling said motor for tracking the light source in a direction of the detected body.

10. Device according to claim 1, wherein an intensity control is provided for regulating intensity of the light emitted from the light source, said intensity control responding when the body approaches the active region of the sensor and exceeds a predetermined value, and controlling the light source at least at partial output when the predetermined value is exceeded.

11. Device according to claim 10, wherein the intensity control controls output of the light source in such a manner that the intensity increases to maximum output when the body moves away and decreases to a minimum value or until it is deactivated when the body continues to approach the sensor.

12. Device according to claim 1, wherein an indicating device for acoustic acknowledgement is provided with at least one sound or acoustic pattern.

13. Method for controlling a device for controlling lighting, more especially for the interiors of automotive vehicles, supplying a sensor signal by a sensor;

generating a control signal in a control unit in dependence on the sensor signal, the control unit associated with a light source and the control signal controlling at least one light source;

detecting at least movement of a body or of a part of the body in an active region of the sensor; and control means tracking the light source in dependence on the sensor signal of the movement of the body corresponding at least to position of the body;

wherein the sensor recognizes a movement pattern of the body;

wherein the sensor signal generated in dependence on the movement pattern in such a manner that the control means tracks light to the movement of the body in terms of amplitude and where applicable according to direction on account of the sensor signal.

14. Method according to claim 13, wherein the control means partially activates lighting means of the light source, working in different directions, for direction-dependent tracking in the direction of the detected body.

15. Method according to claim 13, wherein the control means controls a motor, associated with the light source, for direction-dependent tracking of the light source in the direction of the detected body.

16. Method according to claims 13, wherein when the body approaches the active sensor region of the sensor, the sensor being an optical sensor, associated with the light source, a value of positional detection deviates by more than a predetermined value from a central axis of a positional detection region, this is recognized as a movement pattern and light is activated in direction of the body or is deactivated.

17. Method according to claim 16, wherein the light direction determined by the positional detection of the body is retained if no more change in the position of the body is detected.

18. Method according to claim 13, wherein the sensor detects proximity of and the position of the body in a three-dimensional manner.

19. Method according to claim 13, wherein an intensity control responds when the body approaching the active sensor region is recognized as a movement pattern and the sensor signal exceeds a predetermined value, and the light source is operating with at least partial output when the predetermined value is exceeded.

20. Method according to claim 19, wherein the intensity control continues to control an output of the light source in such a manner that when the body moves away intensity increases to maximum output and when the body continues to approach the sensor the intensity decreases to a minimum value or respectively until it is deactivated.

21. Method according to claim 20, wherein the output decreases to the minimum value on the first approach and is only deactivated if the approach continues.

22. Method according to claim 13, wherein when a predetermined distance between the body and the sensor is exceeded, a current direction of operation is fixed.

23. Method according to claim 13, wherein the sensor recognizes a movement pattern and the control means controls the device by way of this movement pattern, the control comprising:

activating the light source with at least partial intensity as a result of the body approaching;

increasing the intensity and directing at the same time the light in the direction of the body as a result of the body moving away; and retaining the intensity of the light in a desired position as the body continuously moves away.

24. Method according to claim 13, wherein the sensor recognizes approaching of the body for deactivating the device and where a predetermined distance between the body and the sensor is fallen below and when the body continues to approach, said distance corresponding to a maximum of the active region of the sensor, the light source is gradually turned down or regulated down until the light source is extinguished, where applicable when the body makes repeated approaches.

25. Method according to claim 13, wherein where the body makes a movement in the active region of the sensor at a constant distance from the sensor, the light is tracked in a direction-dependent manner at constant intensity.

26. Method according to claim 13, wherein for gradual tracking of light intensity, the control unit, proceeding from a condition at predetermined intensity with a predetermined position of the body, either changes the intensity in one direction if the body continues to approach, or changes it in the another direction if the body continues to move away, and in that obtained intensity is retained at least until a new movement is made past the obtained intensity.

27. Method according to claim 26, wherein below a predetermined intensity, the light is only reducible until the light source is deactivated.

* * * * *